US010177405B2

(12) United States Patent
Spatocco et al.

(10) Patent No.: US 10,177,405 B2
(45) Date of Patent: Jan. 8, 2019

(54) LOW-TEMPERATURE LIQUID METAL BATTERIES FOR GRID-SCALED STORAGE

(71) Applicant: Massachusetts Institute of Technology, Cambridge, MA (US)

(72) Inventors: Brian L. Spatocco, Cambridge, MA (US); Paul J. Burke, Framingham, MA (US); Donald R. Sadoway, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 247 days.

(21) Appl. No.: 14/045,967

(22) Filed: Oct. 4, 2013

(65) Prior Publication Data
US 2014/0099522 A1  Apr. 10, 2014

Related U.S. Application Data

(60) Provisional application No. 61/710,398, filed on Oct. 5, 2012.

(51) Int. Cl.
*H01M 10/0562* (2010.01)
*H01M 10/054* (2010.01)
*H01M 10/20* (2006.01)
*H01M 10/22* (2006.01)
*H01M 10/39* (2006.01)

(52) U.S. Cl.
CPC ..... *H01M 10/0562* (2013.01); *H01M 10/054* (2013.01); *H01M 10/20* (2013.01); *H01M 10/22* (2013.01); *H01M 10/39* (2013.01); *H01M 10/399* (2013.01)

(58) Field of Classification Search
CPC ................. H01M 10/0563; H01M 10/0562
See application file for complete search history.

(56) References Cited

U.S. PATENT DOCUMENTS

| | | | |
|---|---|---|---|
| 3,057,946 A | 10/1962 | Eidensohn | 136/86 |
| 3,507,703 A | 4/1970 | Heredy | 136/86 |
| 4,457,989 A | 7/1984 | Coetzer | 429/102 |
| 5,011,748 A * | 4/1991 | Shacklette | H01M 4/131 429/217 |
| 6,548,212 B1 * | 4/2003 | Heider | H01M 10/0525 252/62.2 |

(Continued)

FOREIGN PATENT DOCUMENTS

WO    WO2011116236 A  *  9/2011  .......... H01M 4/9016

OTHER PUBLICATIONS

Define, Enable, Merriam Webster.*

(Continued)

*Primary Examiner* — Sarah A. Slifka
*Assistant Examiner* — Brian R Ohara
(74) *Attorney, Agent, or Firm* — Sunstein Kann Murphy & Timbers LLP

(57) ABSTRACT

An electrochemical cell and its method of operation includes an electrolyte having a binary salt system of an alkali hydroxide and a second alkali salt. The anode, cathode, and electrolyte may be in the molten phase. The cell is operational for both storing electrical energy and as a source of electrical energy as part of an uninterruptible power system. The cell is particularly suited to store electrical energy produced by a renewable energy source.

12 Claims, 14 Drawing Sheets

(56) References Cited

U.S. PATENT DOCUMENTS

| | | | | |
|---|---|---|---|---|
| 2002/0015886 A1* | 2/2002 | Ogasawara | H01M 4/32 | 429/223 |
| 2003/0044686 A1* | 3/2003 | Bushong | H01M 12/065 | 429/253 |
| 2004/0229116 A1* | 11/2004 | Malinski | H01M 2/145 | 429/144 |
| 2008/0044725 A1* | 2/2008 | Sadoway | H01M 2/0252 | 429/149 |
| 2011/0014503 A1* | 1/2011 | Bradwell | H01M 10/39 | 429/50 |
| 2011/0104526 A1* | 5/2011 | Boxley | H01M 2/1646 | 429/50 |
| 2012/0077070 A1* | 3/2012 | Soloveichik | H01M 10/26 | 429/129 |
| 2012/0104990 A1 | 5/2012 | Boysen et al. | | 320/101 |
| 2013/0084474 A1* | 4/2013 | Mills | H01M 4/9016 | 429/9 |
| 2013/0136980 A1* | 5/2013 | Bartling | H01M 4/38 | 429/188 |

OTHER PUBLICATIONS

International Searching Authority, International Search Report—International Application No. PCT/US2013/063472, dated Jan. 27, 2014, together with the Written Opinion of the International Searching Authority, 9 pages.

* cited by examiner

LOW-TEMPERATURE LIQUID METAL BATTERIES FOR GRID-SCALED STORAGE

CROSS-REFERENCE TO RELATED APPLICATIONS

This patent application claims priority to U.S. Provisional Patent Application No. 61/710,398 filed Oct. 5, 2012, the disclosure of which is incorporated by reference herein in its entirety.

STATEMENT REGARDING FEDERALLY SPONSORED RESEARCH OR DEVELOPMENT

This invention was made with government support under Grant No. DE-AR0000047 awarded by ARPA-E. The U.S. government has certain rights in the invention.

TECHNICAL FIELD

The present invention relates to liquid metal galvanic electrochemical cells for use in dynamic storage of energy, and more particularly to these galvanic cells operating at low temperatures.

BACKGROUND ART

Electrical energy generation in the United States relies on a variety of energy sources that are then converted into electricity, such as fossil, nuclear, solar, wind and hydroelectric. Apart from the concern of the dwindling supply of fossil fuel, one of the great challenges of energy supply chains is balancing supply with demand. Part of the problem is the inability to store electrical energy in an efficient way so that it can be turned on or off to match high or low energy demand. For example, some sources of energy, such as a nuclear plant, cannot easily be switched off and on or in the cases of the renewable resources, such as wind or solar power, are dependent on natural forces beyond our control which may not be productive when needed or become productive when not needed. This mismatch is one of the factors that limit the adoption of these sources of energy. Electrochemical cells using liquid metals have been developed but require the use of expensive materials and high temperature to be operative. To be affordable on a large scale use, there remains a need for the provision of low cost, efficient storage of electrical energy that may support commercial electrical energy management.

SUMMARY OF THE EMBODIMENTS

Using a number of variables, a relatively inexpensive electrochemical system has been developed that can operate at much lower temperatures than conventionally known liquid metal electrochemical cells using metals that are abundant and readily available.

In a first embodiment of the invention, there is provided an electrochemical cell having an active alkali metal with three distinct phases. The first phase defines a positive electrode and includes a metal other than the alkali, but which can form an alloy with the alkali, such alloy having a different potential than the alkali at the negative electrode. The second phase defines the electrolyte and includes one or more salts of the alkali metal and includes at least hydroxide anions. The first phase is in contact with the second phase at one of two interfaces of the second phase. The third phase defines a negative electrode having the alkali metal, such as sodium, in its elemental, metallic form. The third phase is separate from the first phase and in contact with the second phase at its second of two interfaces. The first and third phases have respective volumes which decrease or increase at the expense of one another during operation of the cell. As a result the second phase is displaced from a first position to a second position depending on the charging or discharging operation of the cell. The first, second and third phases may be solid (such as during manufacturing or transport or maintenance of the cell), liquid (generally in operation), or in a combination of solid or liquid states. The alkali metal when present, resides at respective disparate chemical potentials in the first and third phases, originating a voltage between the first and third phases.

In another embodiment, the electrochemical cell is in a discharged state and may include two distinct phases defining the positive electrode and electrolyte, such as prior to use. The first phase defines a positive electrode and includes the alkali metal and an elemental metal other than the alkali. The second phase includes salts of the alkali metal, and defines two separate interfaces. The first phase is in contact with the second phase at one of the interfaces.

In some embodiments, the first phase comprises a metal of any one of the groups IIA, IIIA, IVA and VA of the periodic table of the elements. In some embodiments, this metal is selected from at least one of cadmium, tin, mercury, lead, antimony and bismuth. In some embodiments, this metal is mercury. In some embodiments, this metal is lead. In some embodiments, this metal is an alloy of lead and antimony. In some embodiments, this metal is an alloy of lead and bismuth. In some embodiments, the metal is an alloy comprising mercury. In some embodiments, this metal is a eutectic of an alloy. In some embodiments, the alloy is 20 atomic % lead in bismuth.

In some embodiments, the electrolyte includes a hydroxide salt of the alkali, in combination with one, two or more other salts, such as a halide, sulfate, carbonate or amide of the alkali. In some other embodiments, the electrolyte includes a binary salt system of a hydroxide salt and another salt such as iodide. In some other embodiments, the electrolyte also includes a salt of a second alkali. In some other embodiments, the second alkali is potassium. In some embodiments, the electrolyte has an ionic conductivity selected from about 1 to about 1.5 S/cm.

In some embodiments, the alkali metal is sodium. In some embodiments, the device is a Na/NaOH—NaI/Hg, a Na/NaOH—NaI/Sb—Pb, or a Na/NaOH—NaI/Bi—Pb electrochemical cell.

In some embodiments, the first, second and third phases have a melting temperature independently selected from about 300° C. or below. In some other embodiments, the first, second and third phases have a melting temperature independently selected from about 200° C. to about 300° C. In some other embodiments, the first, second and third phases are molten phases.

In accordance with other embodiments, a battery includes two or more electrochemical cells as described above. In other embodiments, a system includes a plurality of batteries, as described above, electrically connected in series. Alternatively, the system may include a plurality of these batteries electrically connected in parallel, or, a plurality of the noted batteries electrically connected in series and in parallel.

Among others, the electrochemical system may have a total capacity of less than about 30 kWh. In other embodiments, the electrochemical system may have a total capacity of more than about 30 kWh.

In some embodiments, some of the inner walls of the electrochemical cells in contact with at least the first and third phases are covered with an insulating material. This insulating material may be a polymer stable at temperatures below 300° C. In some embodiments, the insulating material is poly(oxyethylene) methacrylate-g-poly(dimethyl siloxane) (POEM-g-PDMS).

In other embodiments, there is provided a method to store electrical energy transferred from an external circuit into the electrochemical cell as described above. To that end, the method provides at least one electrochemical cell having either two or three phases. When using a fully discharged cell, the first phase defines a positive electrode and includes a metal other than the alkali, but which can form an alloy with the alkali, such alloy having a different potential than the alkali at the negative electrode. The second phase defines the electrolyte and includes one or more salts of the alkali metal and includes at least hydroxide anions. The first phase is in contact with the second phase at one of two interfaces of the second phase. The third phase defines a negative electrode having the alkali metal, such as sodium, in its elemental, metallic form. The third phase is separate from the first phase and in contact with the second phase at its second of two interfaces. When used to store electrical energy, the first phase has a volume which decreases while the third phase has a volume which increases thus transferring energy from the external circuit to the electrochemical cell. As a result, the second phase is displaced from a first position to a second position.

In other embodiments, there is provided a method to use electrical energy transferred from an external circuit into the electrochemical cell as described above. To that end, the method provides at least one electrochemical cell having three phases as described above. When the cell is used to release electrical energy, the first phase has a volume which increases while the third phase has a volume which decreases thus transferring energy from the electrochemical cell to the external circuit. As a result the second phase is displaced from a first position to a second position in a reverse motion from the charging mode.

In some embodiments, the method includes an electrochemical cell connected to one or more of an electric power plant or renewable energy source, a power transmission line, or an external circuit that delivers energy converted from a renewable energy source. In some embodiments, the method includes an electrochemical cell that is part of a system to provide a continuous or steady power supply.

BRIEF DESCRIPTION OF THE DRAWINGS

The foregoing features of embodiments will be more readily understood by reference to the following detailed description, taken with reference to the accompanying drawings, in which:

FIG. 2A shows when the cell is discharged, FIG. 2B shows when the cell is in operation and connected to a source of energy (charging circuit), and FIG. 2C shows when the cell is charged.

FIG. 3A shows when the cell is charged, FIG. 3B shows when the cell is in operation and connected to a load, and FIG. 3C shows when the cell is discharged.

DETAILED DESCRIPTION OF SPECIFIC EMBODIMENTS

Figure 1:
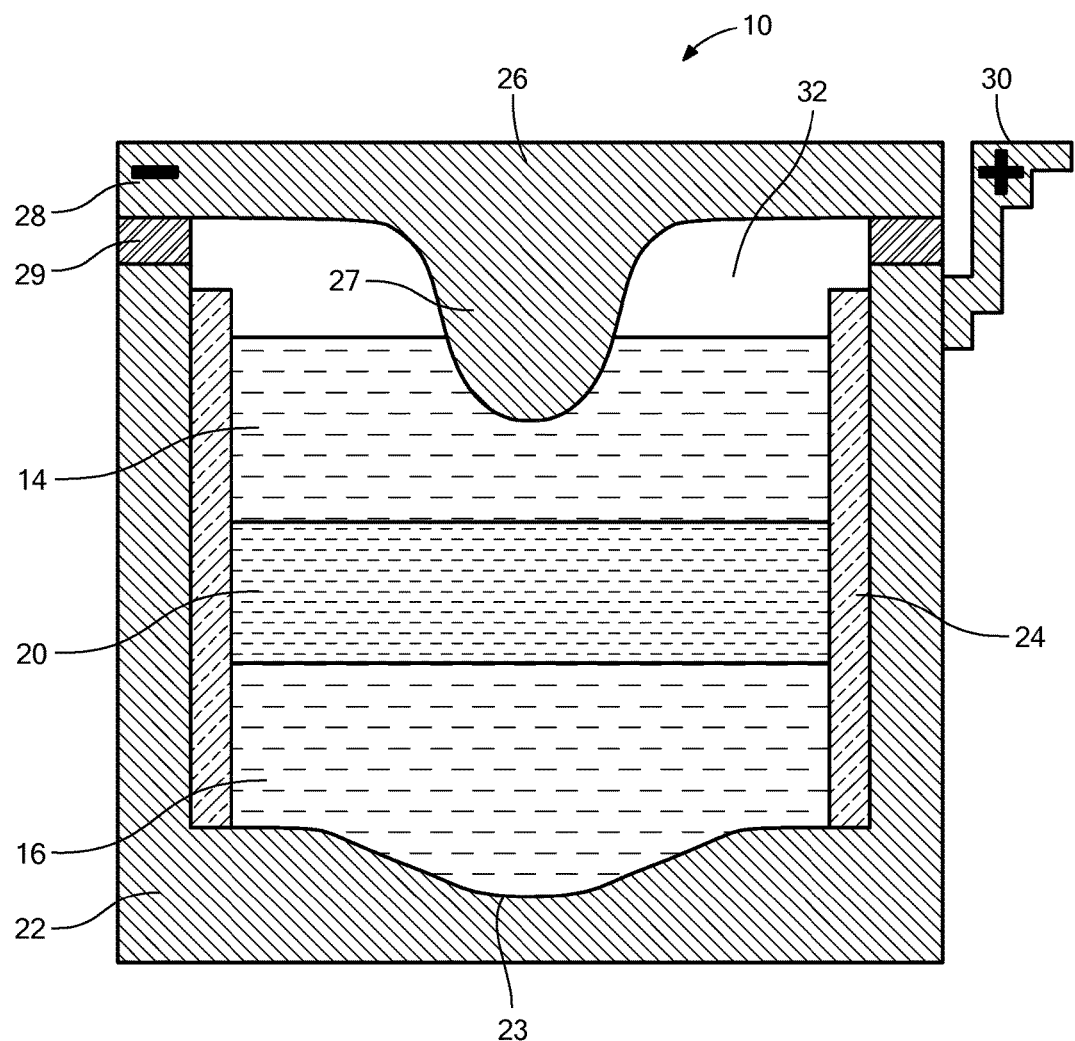
FIG. 1 is a vertical cross-sectional view showing a self-assembling alkali metal-ion energy storage electrochemical cell constructed in accordance with the invention.

Embodiments of the invention significantly decrease the material, assembly, and system costs of liquid metal batteries while at the same time increasing their lifetime and suitability for ubiquitous deployment in a distributed power-grid network. All of these advances are possible due to lower operating temperatures resulting from advantageous chemistries of the electrolyte system and the metals in the positive and negative electrodes. Specifically, the chemistries are selected such that the operating temperature of the cell can be dramatically lowered from 500° C. and above of previous chemistries to temperatures below about 300° C., or between about 200° C. and about 300° C. Lowering operating temperatures results in enhanced opportunities and advantages for system design and choice of containment materials and represents a promising new approach towards delivering on the promise of economically feasible widely implementable grid-storage solutions.

The new systems according to embodiments of the present invention represent a notable departure from previous work where materials and components of the cells are selected to minimize costs while maintaining acceptable voltage and energy output.

Historically, the choice of electrode materials has been pursued as an exercise in maximizing the thermodynamic maximum performance while minimizing the costs of the active component of the cell, the electrode and electrolyte. This approach did not take into consideration factors such as the cost of power systems, thermal management, thermally-activated corrosion, high-temperature seals, or limited availability of high temperature resistant containment materials and thus favored systems operable at elevated temperatures in the range of 500° C. to 800° C. In considering systems to be operated at low temperature, more choices become available to address these further factors even though voltage output may not be maximized. A new index has been developed that takes into consideration material performance cost, $C_{mp}$ index, that includes $/kWh values, the bulk market prices, approximated utilization rates, thermodynamic voltages, corrosion, cost of and availability of containment materials, the melting temperatures of the electrodes and electrolyte, and market price per mole for each cell element or compounds for the electrodes and the electrolyte. In embodiments of the present invention, a matrix of electrode couples has been identified based on the $C_{mp}$ index (see table 1). The first element, A, in the pair serves as the negative electrode and the second element, B, serves as the positive electrode.

TABLE 1

| Cmp index | | | |
|---|---|---|---|
| Cmp Index B ($T^{melt}$, ° C.) | A ($T^{melt}$, ° C.) $/mole | Li (180) $0.428 | Na (97) $0.057 |
| Cd (321) | $0.388 | 65 | 138 |
| Sn (118) | $3.220 | 214 | 365 |
| Hg (−39) | $0.274 | 55 | 31 |
| Pb (307) | $0.520 | 64 | 64 |
| Bi (209) | $4.880 | 243 | 304 |

By considering these further factors, a tractable number of candidate electrode couples have been identified which present a low Cmp (see table 1). Because the operating temperature of a system is determined by the highest melting point component, the melting temperature of the electrolyte must also be considered.

In general, a device (e.g., a cell or battery) has a positive electrode with an element that is other than an alkali metal, and a negative electrode having an alkali metal component. These electrodes cooperate to efficiently store and deliver energy across an electrolyte. Although these electrodes and the electrolyte preferably are in a liquid phase during operation, in some embodiments, the device is in a solid phase such as when not in use or for transport. In other embodiments, the device is in a solid-liquid phase mixture. Details of various embodiments are discussed below.

As used herein, the term "battery" may encompass an individual electrochemical cell or cell unit having a positive electrode, a negative electrode, and an electrolyte, as well as configurations having an array of electrochemical cells. FIG. 1 shows an illustrative alkali metal ion energy storage cell, indicated generally at 10, configured in accordance with embodiments of the invention. The cell 10 has three distinct constituents: a molten metal body 14 that serves as negative electrode, also referred to as the active metal electrode; an electrically conductive elemental liquid body 16 that serves as positive electrode; and an intervening ionically conductive electrolyte 20.

The electrically conductive layers 14, 16 and 20 are confined in a container 22 that may be electrically conductive and mechanically supports an insulating inner sheath 24. The sheath 24 prevents shorting by electric conduction between the negative electrode 14 and the positive electrode 16 through the container 22 when such container is made of conductive material. The container 22 is covered by a lid 26 which may be electrically conductive. An electrically insulating seal 29 electrically isolates the lid 26 from the container 22 to confine molten constituents and vapors within the container 22. The portion of the lid 26 in contact with the negative electrode 14 functions as a negative current collector 27, through which electrons may pass to an external source or sink (not shown) by way of a negative terminal 28 that is in contact with the lid 26.

The portion of the container 22 in contact with the positive electrode 16 functions as the positive current collector 23, through which electrons may pass to the external source or load by way of a positive terminal 30 connected to the container 22. The negative terminal 28 and the positive terminal 30 are oriented to facilitate arranging individual cell units in series by connecting the negative terminal 28 of one cell unit to the positive terminal 30 of another cell unit 10 to form a battery. The terminals 28 may also be connected to one another, and the terminal 30 also may be connected to one another to arrange the cells in series.

The cell 10 also may have an inert gas layer 32 overlaying the negative electrode 14 to accommodate global volume changes in the three-phase system produced by 1) charging and discharging, or 2) temperature changes. Optionally, the lid 26 or seal 29 incorporates a safety pressure valve (not shown).

The container 22 and the lid 26 are each formed from material having the requisite electric conductivity (when so required), mechanical strength, and resistance to chemical attack by the liquid electrodes 14 and 16 and electrolyte 20. Depending on the composition of the electrodes, conventional materials such as mild steel may be a suitable material for the container 22 and the lid 26. The sheath 24 may be formed from an electrically insulating material and should be corrosion-resistant against the two liquid electrodes 14 and 16 and the electrolyte 20. While boron nitride, aluminum nitride, alumina, and magnesia are also appropriate materials for the sheath 24, because of the low operating temperature of the cells described herein, other materials such as polymers, like poly(oxyethylene) methacrylate-g-poly(dimethyl siloxane) (POEM-g-PDMS) may be advantageously substituted. The same is true for the seal 29 material. Alternatively, the entire container may be made of polymer, but for current collectors that connect each electrode 14 and 16 to a corresponding positive and negative terminal.

In illustrative embodiments, the electrodes 14 and 16 and electrolyte 20 are constituted to establish chemical and physical properties compatible with simplicity and economy of construction, robustness, and rapid and efficient receipt and delivery of electrical energy. Accordingly, as noted above, the chemical compositions of the molten electrodes 14 and 16 are formulated conjunctionally to incorporate an active alkali metal, such as sodium, potassium, rubidium or cesium, at respective disparate thermodynamic activities, consequently generating a voltage between the electrodes 14 and 16.

To create thermodynamic disparity of the active alkali metal between the negative 14 and positive 16 electrodes, at least one of the electrodes 14 and 16 includes one or more additional elements, other than the alkali metal. Any such additional element may be, for example, miscible in the liquid composition of the electrode 14 or 16 to form an alloy with the alkali metal. A fraction of such additional element may also exist as a compound with the alkali metal under the operating conditions without impairment of the output of the cell. Preferably, the additional elements are chosen such that the alloy melts at temperature lower than 300° C. The one or more additional elements are chosen to constitute the positive electrode 16 as an environment of relatively low thermodynamic activity of the active alkali metal, compared to the negative electrode 14, when the cell 10 is in a charged state. The positive electrode 16 may be a liquid-phase solution, conventionally referred to as an alloy of the active alkali metal. Alternatively, the positive electrode 16 may include a liquid-phase compound of the active alkali metal, and one or more other elements.

It is also possible to alloy the positive electrode metal to achieve a suitable melting temperature. This can allow the use of metals that have attractive voltages despite their high melting temperatures. For example, a Pb—Bi alloy can be used as its eutectic composition melts at 200° C. Alloying the positive electrode metal with metals of lower electronegativity may be advantageously used to lower the melting point of the liquid metal alloy (e.g., antimony melts at 631° C., while the lead-antimony eutectic alloy melts at 253° C.). Optimization of the electrode material composition can lead to additional cost savings through further operating temperature reduction.

This, in turn, allows the cells to operate at a lower temperature and/or operate more efficiently. Lowering the melting point of the cathode materials can also increase the solubility limit of the alkali metal in the cathode, which represents an increase in capacity of the cathode and decrease the cost per energy storage capacity of the cell. Furthermore, a cell operating at a lower temperature should experience less corrosion and potentially extended operating lifespan of the cell. Numerous factors are important when choosing additional elements for the electrodes 14 and 16.

For example, those factors include among other things, the chemical equilibrium and solution thermodynamics in the electrodes 14 and 16, their interactions with the electrolyte 20, their relative densities, melting points and boiling points. It is preferred to select elements that create alloys with low melting point and a high boiling point. Those additional elements in the electrodes 14 or 16 ideally should not interact with the ions in the electrolyte in a way that would provide a competing pathway for charge transport and circumvent the prescribed electrode reactions.

As noted, the positive electrode 16 may include one or more elements besides the alkali metal. The positive electrode 16 of binary or higher order composition may have physical properties that allow the cell 10 to operate at a lower temperature. Elements that may be appropriate for incorporation in the positive electrode 16 include one or more elements of Groups IIA, IIIA, and IVA of the periodic table of the elements, such as cadmium, tin, mercury, lead, antimony and bismuth and alloys thereof.

The compositions of the electrode 14 and 16 and electrolyte 20 may be formulated so that all-liquid operation may be reached at relatively low temperatures, such as lower than about 300° C., such as between about 200° C. and about 300° C. Operating at relatively low temperatures reduces the solubility of the alkali in the electrolyte 20. Difficulties such as volatilization of cell constituents, structural weakness, chemical attack of ancillary materials, and power required to maintain liquidity of the electrodes 14 and 16 and electrolyte 20 become more manageable as operating temperature decreases, reducing the cost of operating the cell 10.

Most widely used electrolytes are metal-halide salt mixtures that have eutectic melting temperatures in excess of 300° C. In contrast, for systems operating at low temperature, hydroxide based electrolytes, such as sodium hydroxide, are of particular interest for several major reasons. First, sodium hydroxide salts form deep eutectics with a number of other sodium salts. These include, for example, NaOH—NaBr (260° C.), NaOH—NaI (230° C.), NaOH—Na$_2$SO$_4$ (294° C.), and NaOH—Na$_2$CO$_3$ (286° C.). Secondly, molten sodium hydroxide has very high ionic conductivities in the range of 1.0-1.5 S/cm$^2$ which enables high current densities of the systems. Third, pure sodium metal is stable with its own hydroxide molten salt. Pure sodium is also stable with polymer components, like poly(oxyethylene) methacrylate-g-poly(dimethyl siloxane) (POEM-g-PDMS), which become available for use as insulating materials for the cells instead of brittle ceramics.

Hydroxide salts, and particularly with sodium, are highly hygroscopic and generally contain some amount of water. In systems with pure sodium metal and sodium hydroxide, these components could undergo two primary reactions:

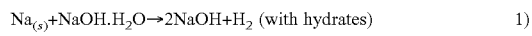
$$Na_{(s)} + NaOH \cdot H_2O \rightarrow 2NaOH + H_2 \text{ (with hydrates)} \qquad 1)$$

$$Na_{(s)} + NaOH \rightarrow Na_2O + H_2 \qquad 2)$$

While the second reaction is detrimental for the system because it forms Na$_2$O which is a solid that significantly decreases the electrolyte conductivity, it occurs thermodynamically less often in the case of sodium. The system may tolerate a minor amount of this secondary reaction because it shifts the equilibrium away from the water (via Le Chatelier's principle).

The electrodes 14 and 16 and the electrolyte 20 may be further formulated so that their densities are ordered in accordance with their functions in the cell 10. Various embodiments having respective densities increasing, as shown in FIG. 1, or decreasing in the order negative electrode 14/electrolyte 20/positive electrode 16 may spontaneously self-assemble into the illustrated vertically stacked, layered structure upon melting, providing for simpler manufacture.

The illustrative alkali metal ion cell 10 receives or delivers energy by transporting an alkali metal, referred to herein as the active alkali metal, between the two electrically conductive molten electrodes 14 and 16 via an electrochemical pathway. The liquid electrolyte 20, comprising a cation of the active alkali metal, enables ionic transport of the active alkali metal during charging or discharging.

An illustrative electrochemical cell is preferably constructed in a fully discharged state by first melting the alloy of the alkali metal and the one or more other elements as the cathode. The electrolyte is then added. The negative electrode current collector is then installed, and the cell is heated to the operating temperature inside an argon filled test vessel.

Figure 2A:
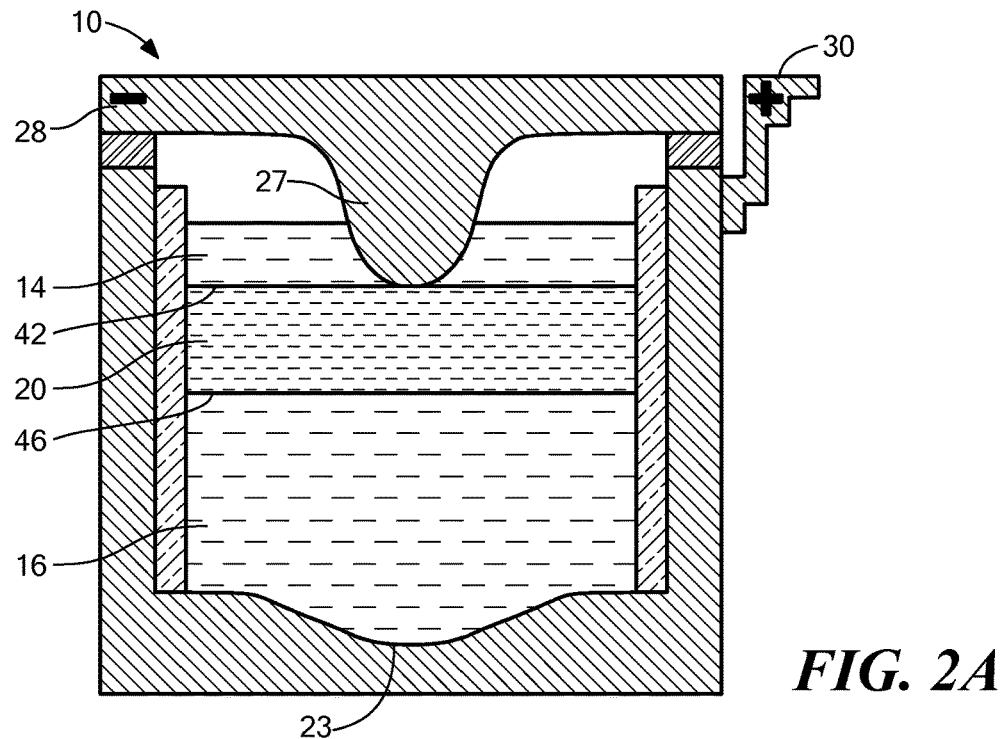
FIGS. 2A-2C are vertical cross-sectional views illustrating the charging process of an alkali metal-ion energy storage electrochemical cell constructed in accordance with the invention.
Figure 2B:
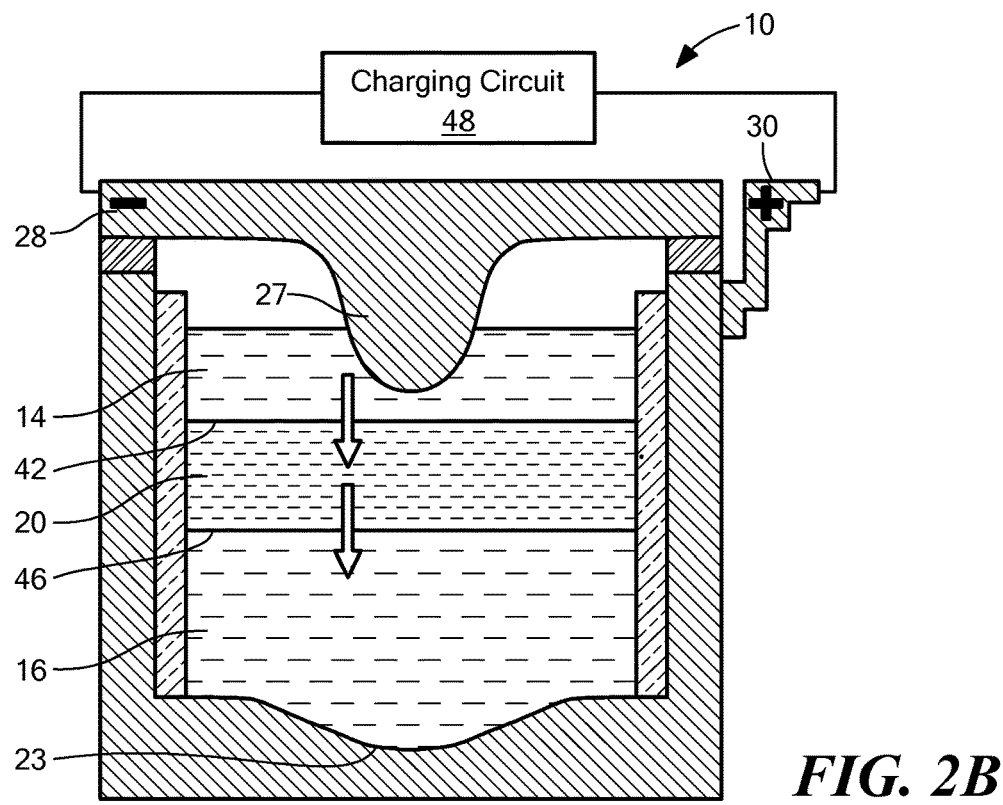
Figure 2C:
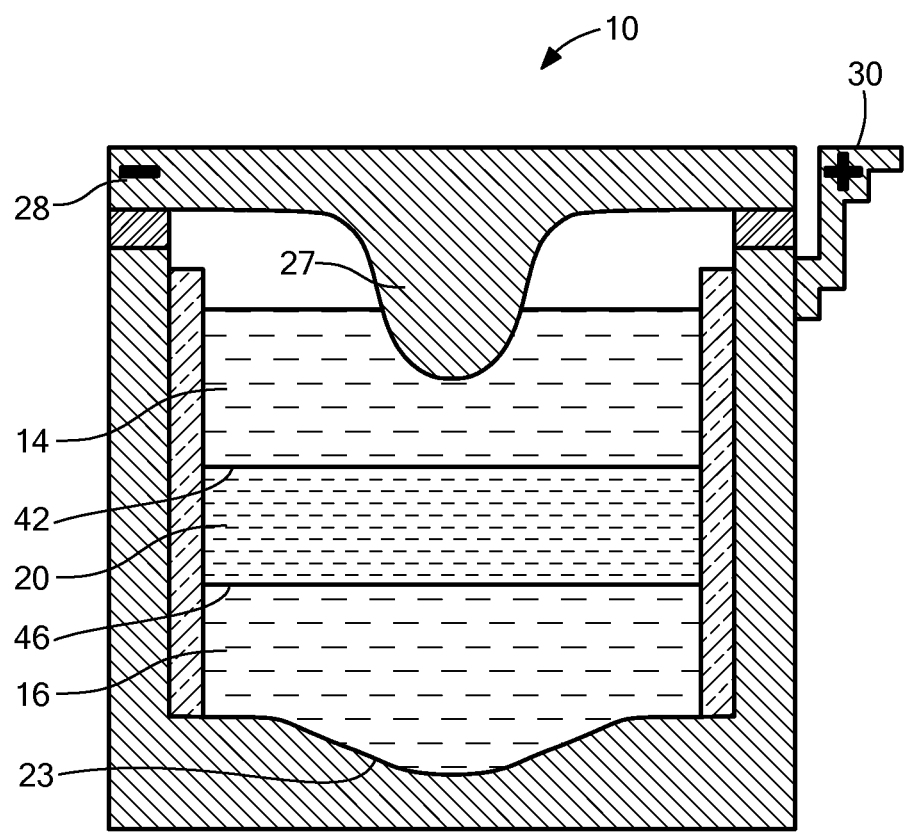

FIGS. 2A-2C illustrate the function of the cell 10 during charging. FIG. 2A shows the cell 10 in an uncharged or discharged state. Before charging, the positive electrode 16 contains atoms of the active alkali metal. The negative electrode 14 meets the electrolyte 20 at an active metal-electrolyte interface 42. In a corresponding manner, the positive electrode 16 meets the electrolyte 20 at a separate alloy-electrolyte interface 46. As shown and discussed below, these interfaces move during charging and discharging, while maintaining the general volume of the electrolyte, while the volumes of the positive and negative electrodes increase or decrease at the expense of one another. In other words, the positive electrode 16 has a volume that increases or decreases in correlation to a respective decrease or increase of the volume of the negative electrode 14.

Specifically, FIG. 2B shows the effect of the charging process on the components of the cell 10. To initiate charging, the terminals 28 and 30 are connected to an external charging circuit 48, which drives the active alkali metal from the positive electrode 16, through the electrolyte 20 to neutral metal at a higher chemical potential in the negative electrode 14. During charging, electron current travels from the external circuit, through the negative current collector 27, into the negative electrode 14, and to the active metal-electrolyte interface 42. Active cations $M^+$ move across the electrolyte 20 toward the active metal-electrolyte interface 42. The active cations and the electrons meet at the interface 42 and are consumed in the reduction half-cell reaction $M^+ + e^- \rightarrow M$. The neutral active alkali metal atoms M created in the half-cell reaction accrue to the negative electrode 14. As the active alkali metal M accumulates in the negative electrode 14, the active metal-electrolyte interface 42 moves further away from the negative current collector 27. At the alloy-electrolyte interface 46, atoms of the active alkali metal M in the positive electrode are oxidized in the half-cell reaction $M \rightarrow M^+ + e^-$. As active cations $M^+$ enter the electrolyte 20, electrons are freed to pass through the positive current collector 23 to the external charging circuit 48. Oxidation of the active alkali metal atoms M shrinks the positive electrode 16, and the alloy-electrolyte interface 46 moves toward the positive current collector 23.

FIG. 2C shows the cell 10 in its final charged state. Charging has changed the composition of at least the positive electrode 16 by loss of atoms of the active alkali metal. In fact, in some embodiments, the positive electrode 16 may be nominally free of the active alkali metal at this point in the charge-discharge cycle. The thickness of the negative electrode 14 has grown at the expense of the positive electrode 16. Since the charging process is conservative with respect to the active cations, the thickness of the electrolyte 20 is in principle unchanged.

The active alkali metal deposited in the molten active metal electrode 14 represents stored electrical energy which may persist substantially indefinitely, as long as no external electric path joins the two electrodes 14 and 16. The half-cell reactions in the cell 10 generate liquid-phase products that remain at the electrodes 14 and 16, and in contact with the electrolyte. While the electrodes 14 and 16 and electrolyte 20 remain in their liquid state, the active alkali metal and the active cation are available to mechanize charge and discharge via an electrochemical pathway. This reversibility renders the active alkali metal ion cell suitable to use in batteries for energy storage.

Figure 3A:
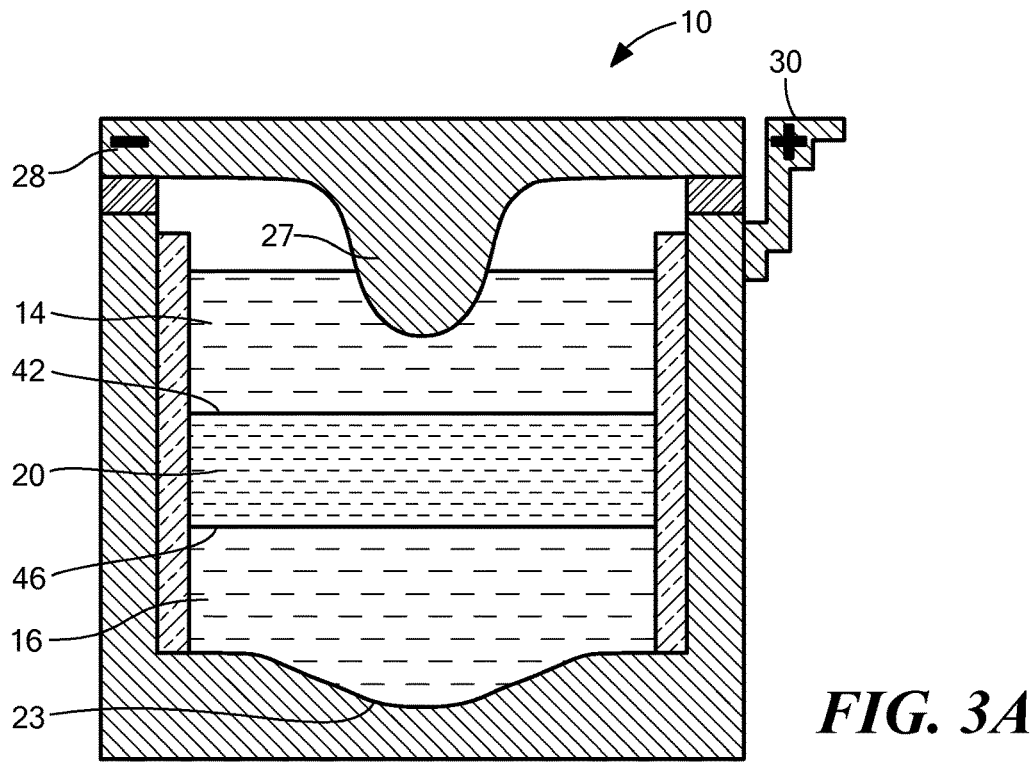
FIGS. 3A-3C are vertical cross-sectional views illustrating the discharging process of an alkali metal-ion energy storage cell constructed in accordance with the invention.
Figure 3B:
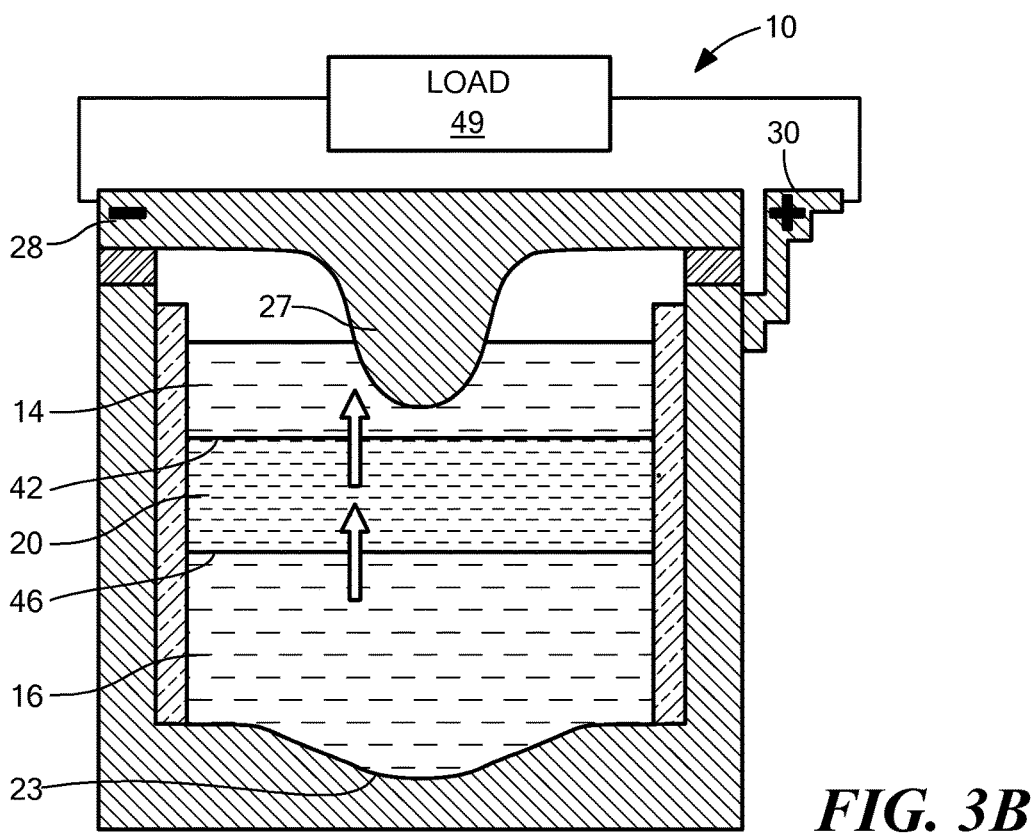
Figure 3C:
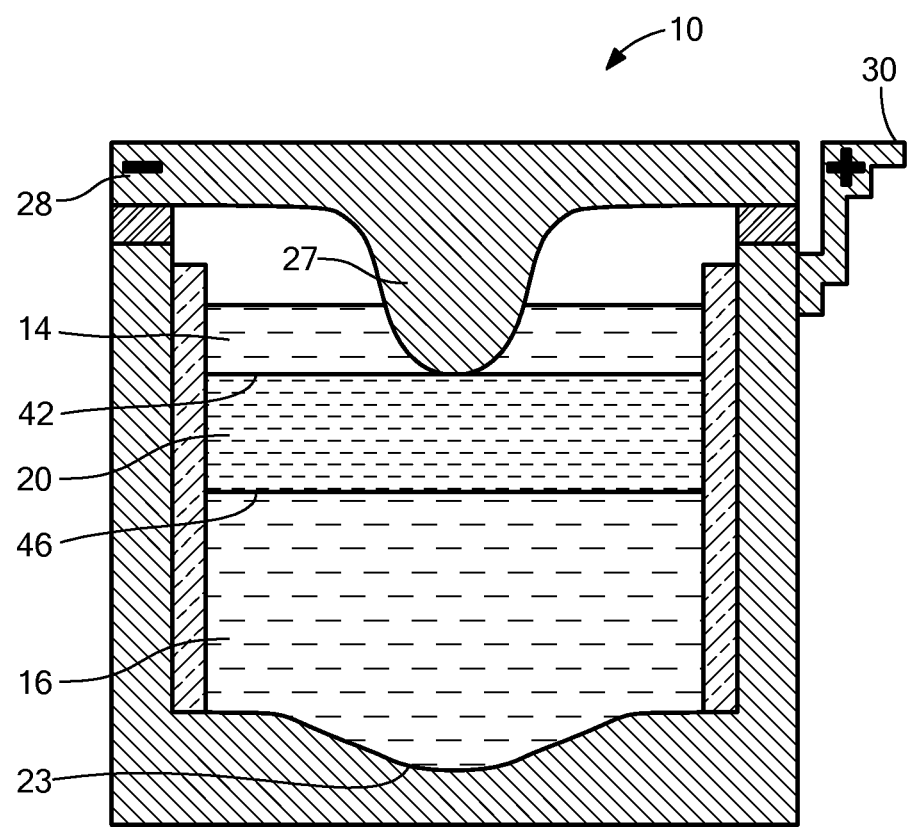

FIGS. 3A-3C illustrate discharging the cell 10. FIG. 3A shows the cell 10 in a charged state, while FIG. 3B shows the cell terminals 28 and 30 connected to an external load 49, which initiates discharge. During discharge the active alkali metal moves spontaneously from the negative electrode 14, through the electrolyte 20 as active cations, and reverts to neutral metal at a lower chemical potential in the positive electrode 16. Electron current travels into the cell through the positive current collector 23 and the positive electrode 16, to the alloy-electrolyte interface 46. Active cations $M^+$ migrate across the electrolyte 20 toward the alloy-electrolyte interface 46. Active cations $M^-$ and electrons are consumed at the interface 46 in the reduction half-cell reaction $M^+ + e^- \rightarrow M$. The neutral active alkali metal atoms M produced accrue to the positive electrode 16. As the active alkali metal M accumulates in the negative electrode 16, the alloy-electrolyte interface 46 moves further away from the positive current collector 23. At the active metal-electrolyte interface 42, atoms of the active alkali metal M in the negative electrode 16 are oxidized in the half-cell reaction $M \rightarrow M^+ + e^-$. The active cations $M^+$ produced enter the electrolyte 20, and the freed electrons pass through the negative current collector 27 to the external load 49. Oxidation of the active alkali metal atoms causes attrition of the negative electrode 14, with movement of the active metal-electrolyte interface 42 toward the negative current collector 27.

FIG. 3C shows the cell 10 in its final discharged state. Charging has changed the composition of at least the positive electrode 16 due to accretion of active alkali metal atoms. The thickness of the positive electrode 16 has grown at the expense of the negative electrode 14. Since the discharging process is conservative with respect to the active alkali metal cations, ideally the thickness of the electrolyte 20 is unchanged.

The charge and discharge sequences of FIGS. 2A-2C and 3A-3C represent anticipated examples of the cell 10 during use. In alternative embodiments, when fully discharged, the entire negative electrode 14 may be completely used—the entire liquid mass making up the negative electrode 14 migrated to the positive electrode 16. This is in contrast to the embodiments shown in FIGS. 2A-2C and 3A-3C. Moreover, some embodiments may implement the cell 10 with solid phase electrodes 14 and 16, and/or a solid phase electrolyte 20. Solid phase electrodes may be favorable for shipping of the cell 10.

The substantially constant thickness of the electrolyte layer throughout the charge-discharge cycles enables the use of an electrolyte layer that is relatively thin compared to those of the electrodes. The thin electrolyte layer, combined with the inherently low resistivity of molten salts (e.g., hydroxides, carbonates, etc.), may minimize the ohmic overpotential associated with the electrolyte. The energy capacity of the cell 10 may be limited by the smaller of the respective quantities of active alkali metal that can be accommodated by the negative electrode 14 and by the positive electrode 16. The energy capacity can be augmented by scaling up the quantity of material in the electrodes 14 and 16 without, in principle, increasing the mass of the electrolyte 20 or its associated IR drop. For example, the thickness of the electrolyte 20 may be on the order of only 10%, 20% or 50% of the thickness of either of the electrodes 14 and 16.

It has been observed that in some instances, the electrolyte more readily wets the bottom of the container than does a molten metal, such as the alloy of the positive electrode. This wetting undesirably blocks electric conduction between the positive electrode and the container. Thus, in some instances it may be desirable to introduce a plug of a material, such as another layer of a metal, by compression fit in the bottom of the container 22, that functions as the positive current collector 23. The alloy of the positive electrode 16 preferably has a greater wettability than the electrolyte 20, and thus secures an electrically conductive pathway between the molten positive electrode 16 and the positive terminal 30.

Figure 4:
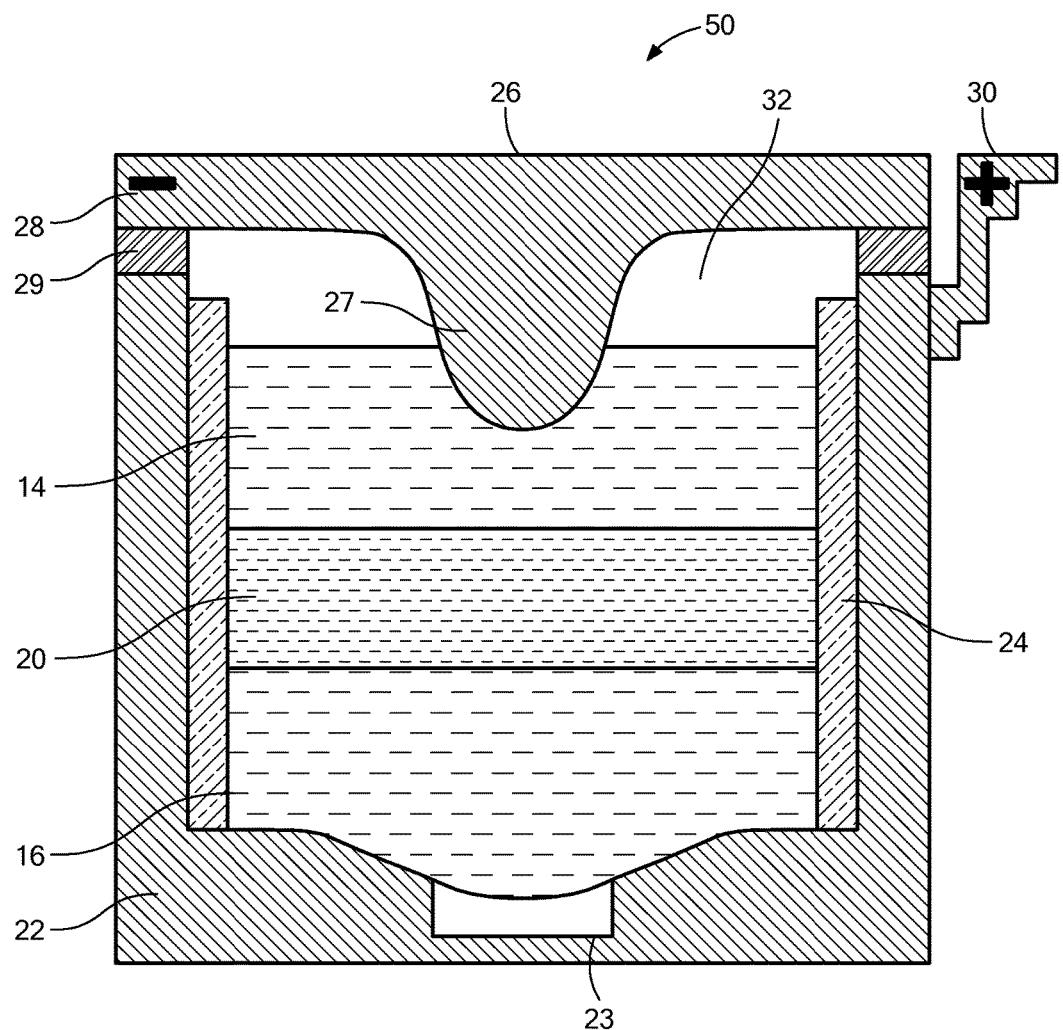
FIG. 4 is a vertical cross-sectional view showing another embodiment of the alkali metal-ion energy storage cell constructed in accordance with the invention.

An alternative embodiment eliminates the expense and complexity of electrically insulating the interior surface of the container 22 as shown for the cell 10 (FIG. 1) and battery 50 (FIG. 4). To that end, the current collector 27 contacts the negative electrode such that the negative electrode has a geometry that does not come in physical contact with the container 22, while allowing contact only with the current collector 27 and the electrolyte 20.

In another alternative embodiment, the alkali metal ion energy storage cell is configured for enhanced robustness by impeding mixing of the two electrically conductive liquids of the electrodes 14 and 16 during shaking or tipping of the container 22. Such features for liquid electrodes are discussed in commonly owned pending U.S. application Ser. Nos. 12/505,937 and 12/839,130, incorporated herein by reference in their entirety.

The alkali metal ion cell 10 (FIG. 1) or 50 (FIG. 4) may be capable of rapidly receiving and dispatching electricity, thus bridging a supply-demand mismatch. The energy-storage cells may operate at extreme temperatures, such as arctic cold and desert heat, without restriction on geographical location and are realizable in a mobile structure.

The power capacity may be large, e.g., on the order of one megawatt (MW) per ten units, and scalable for adaptation from a variety of medium scale capacity for use in residential applications to a variety of large-scale capacity in industrial and power management applications. Several approaches are possible in expanding the capacity of the alkali metal ion energy storage cell to adapt it to the requirements of large-scale applications, on the order of several megawatts. In one approach, scalability may be exploited in a single large alkali metal ion energy storage cell by increasing the mass of the electrodes 14 and 16 and thus, increasing the mass of alkali metal available for transfer within the cell. In another approach, a battery including many smaller alkali metal ion cells connected in series may confer a higher battery voltage more practically integrated with the power electrics necessary to serve large-scale systems. In yet another approach, an array of cells may be interconnected in series and parallel connections for increased robustness with respect to failure due to individual cell malfunction.

One potential use for the alkali metal ion energy storage cell is at a large-scale power generator. The diurnal fluctuation in energy demand reduces plant efficiency, consequently increasing emissions by preventing generator operation at optimum output levels around the clock. A high-capacity electrical energy storage apparatus, with a power capacity greater than 1 MW, could allow load-leveling, which is effected by downloading power from the generator to a storage device during low-demand periods, and then uploading power to the grid during times of higher demand, permitting the power plant to operate at a more constant level—with fewer power spikes.

A second potential use for the alkali metal ion energy storage cell is at renewable energy source converters. Variability in supply makes management of power generated by renewable sources challenging. Sources such as wind and solar energy generate only intermittently. Without adequate power storage, additional power generators are needed on standby to operate in the event that the wind stops blowing, or the sky clouds over. The underutilized capital in the form of excess power generators ultimately may limit the scale of deployment of renewable energy sources. A reliable, high-capacity electrical storage device, used in conjunction with a renewable energy source, should provide dedicated load leveling, thus supporting implementation of renewable energy sources on the grid. Such a combination should also support the use of intermittent renewable energy sources as an alternative to generators in remote, off-grid locations, e.g., locations where periodic delivery of fuel may be difficult.

A third potential use for the alkali metal ion energy storage cell is in support of transmission lines. Transmission and distribution systems generally have no storage capacity. The grid therefore must meet instantaneous demand. As the load on a transmission line approaches its capacity, it incurs heavy ohmic losses, which decrease its efficiency. Furthermore, the resulting resistive heating can melt system components and cause transmission line failure. Portable generators of the requisite power capacity (tens of MW) available to boost supply at the load center may be noisy, polluting, and require periodic refueling. Upgrading or replacing transmission lines as they reach capacity limits is very expensive, time consuming, and frequently meets with public opposition.

A re-locatable alkali metal ion energy storage unit located near a load center could supply a portion of the energy carried by the transmission line during peak hours of the day, thus mitigating load demands on the line. Ideally, the storage unit would provide a significant portion, for example, at least 2% to 20% of the line's capacity, which is typically on the order of 500 MW. Such a unit could defer the need for a transmission line upgrade. Alternatively, a portable alkali metal ion energy storage unit could be deployed to supply emergency power after a system failure, or to maintain power delivery during construction of new lines. The storage unit then can be relocated when no longer needed.

Distribution systems from load centers suffer similar problems, although at much lower loads, and could similarly be addressed using a portable power storage unit. Commercial and residential consumers requiring a constant supply of electricity are especially vulnerable to blackouts. Auxiliary generators are less than ideal for backup because they require time to reach full output levels. These consumers would benefit from backup power systems, or uninterruptible power systems ("UPS"), configured to provide continuity in electricity in the event of a grid-power failure. A charged alkali metal ion energy storage unit, configured to discharge when the power is interrupted, could meet that need. Finally, a facility that is sensitive to voltage irregularities can be adversely affected by brownouts or other inconsistencies in delivered power. A UPS in the form of a charged alkali metal ion energy storage unit, configured to discharge to eliminate deviations from the desired power level, could act as a buffer between the grid and the facility to ensure high power quality.

Many large-scale implementations are expected to have a capacity of greater than about 30 kWh. An alkali metal ion energy storage cell of capacity lower than 30 kWh may be implemented at a small commercial or residential level, where an energy source, such as solar panels or individual wind turbines, may be used to charge the cell. Such a system should provide a continuous source of electricity to sustain the energy needs of the commercial or residential facility. These types of cell systems may be used advantageously in remote locations, off the grid, where the import of electricity with power lines is exorbitant or not practicable. Of course, such systems may be used in various other environments, such as in an urban or suburban environment.

Alkali metal ion energy storage cells thus may achieve high current capability while using low-cost, abundant metal in the alloy compositions. Selection of the alkali metal, electrolyte, and alloy in various combinations discussed herein permits a self-assembling cell and enables low-cost manufacturing.

EXAMPLES

Example 1: The Na—Hg System

The sodium-mercury system provides components with extremely low melting point, relatively inexpensive active materials, suitable voltage, compatibility with common cell engineering materials. The eutectic composition of NaOH and NaI was chosen as the electrolyte to achieve suitable ionic conductivity at the lowest operating temperature. The operating temperature of the cell is 275° C.

Figure 5:
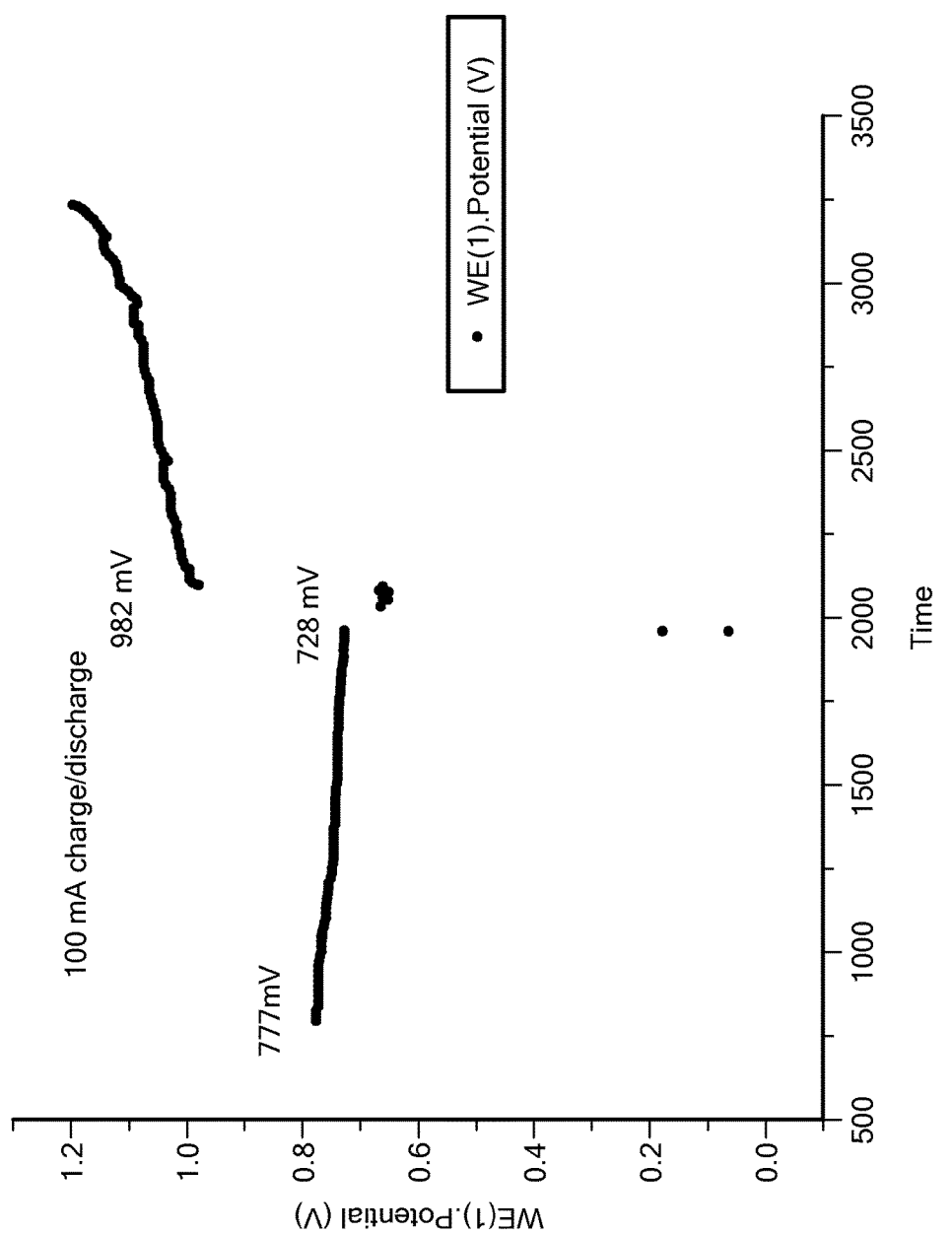
FIG. 5 is a plot of a discharge and charge cycle of a Na|NaOH—NaI|Hg system according to an embodiment of the invention.

FIG. 5 shows the discharge and charge curve for a Na|NaOH—NaI|Hg cell, using a cell with approximately 5% sodium in the positive electrode ab initio. The results confirm the starting voltage (which can also be theoretically calculated from the literature) to be between 774 mV and 778 mV.

Figure 6:
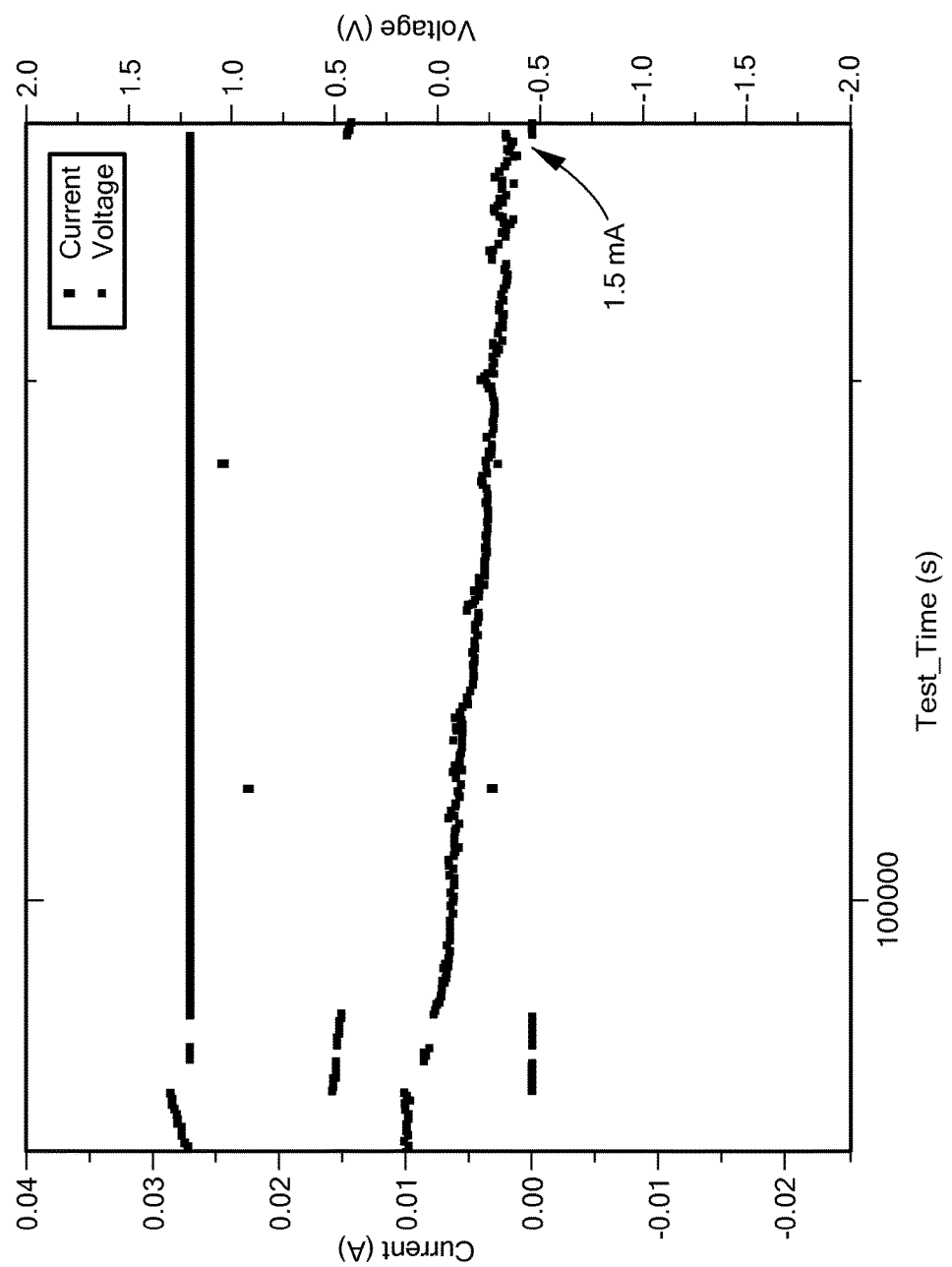
FIG. 6 is a plot of the leakage current of the system of FIG. 5 measured via a constant voltage measurement at 1.2 V.

As shown in FIG. 6, further tests of the NaOH—NaI electrolyte system show low leakage currents. FIG. 6 shows a leakage current measurement made in fully assembled Na—Hg 3 Ah cells. As shown, the current decays down to 1.5 mA for a system with an active surface area of 2 $cm^2$. Thus, the leakage current is approximately 0.75 $mA/cm^2$. This shows that the active sodium metal has a low solubility in this type of electrolyte system.

Figure 7:
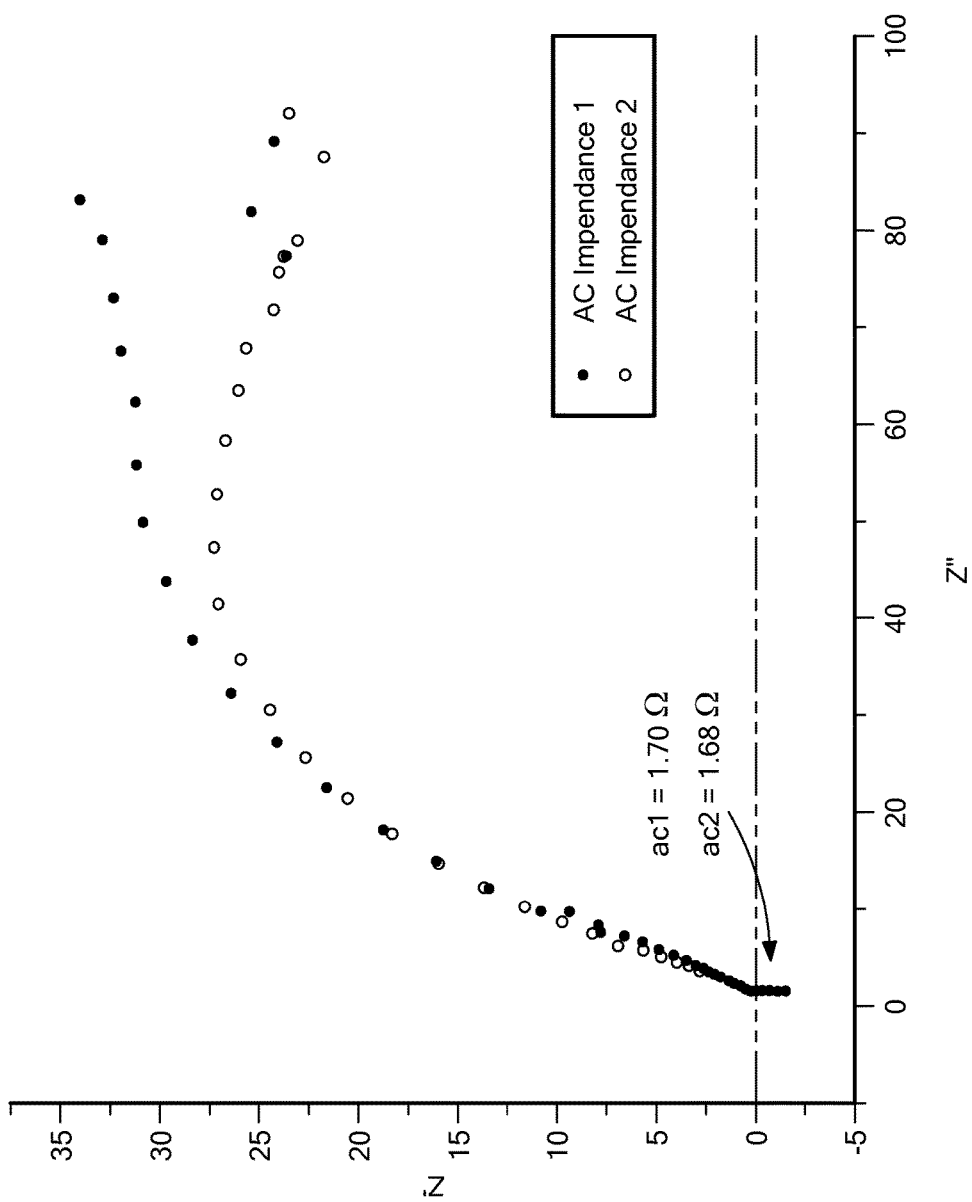
FIG. 7 is a plot of an internal resistance measurement made via AC Impedance of a fully liquefied system according to FIG. 5 with an active area of approximately 5.77 cm$^2$.

The Na—Hg system was also tested to determine the approximate order of magnitude of the internal resistance of the cell. The internal resistance, also known as "IR drop," is an important characteristic of any electrochemical cell which stores energy. The IR drop causes a voltage drop during discharge and a voltage increase during charge. In turn, less energy is extracted than is theoretically possible in the former case and more energy is needed to charge in the latter case. The IR measurements in this system were difficult to pinpoint however the best result is shown in FIG. 7.

Example 2: The Na—Pb/Sb System

A Na—Pb/Sb system was developed as another low temperature chemistry because of the high theoretical potential of the Na—Sb alloy, and because alloying Sb with Pb effectively lowers the melting temperature of the alloy without sacrificing excessive potential. The NaOH—NaI eutectic electrolyte was utilized to build the cells. For the alloy at the anode, 18 atomic % of Pb in Sb was used. The operating temperature of the cell was 275° C.

Figure 8:
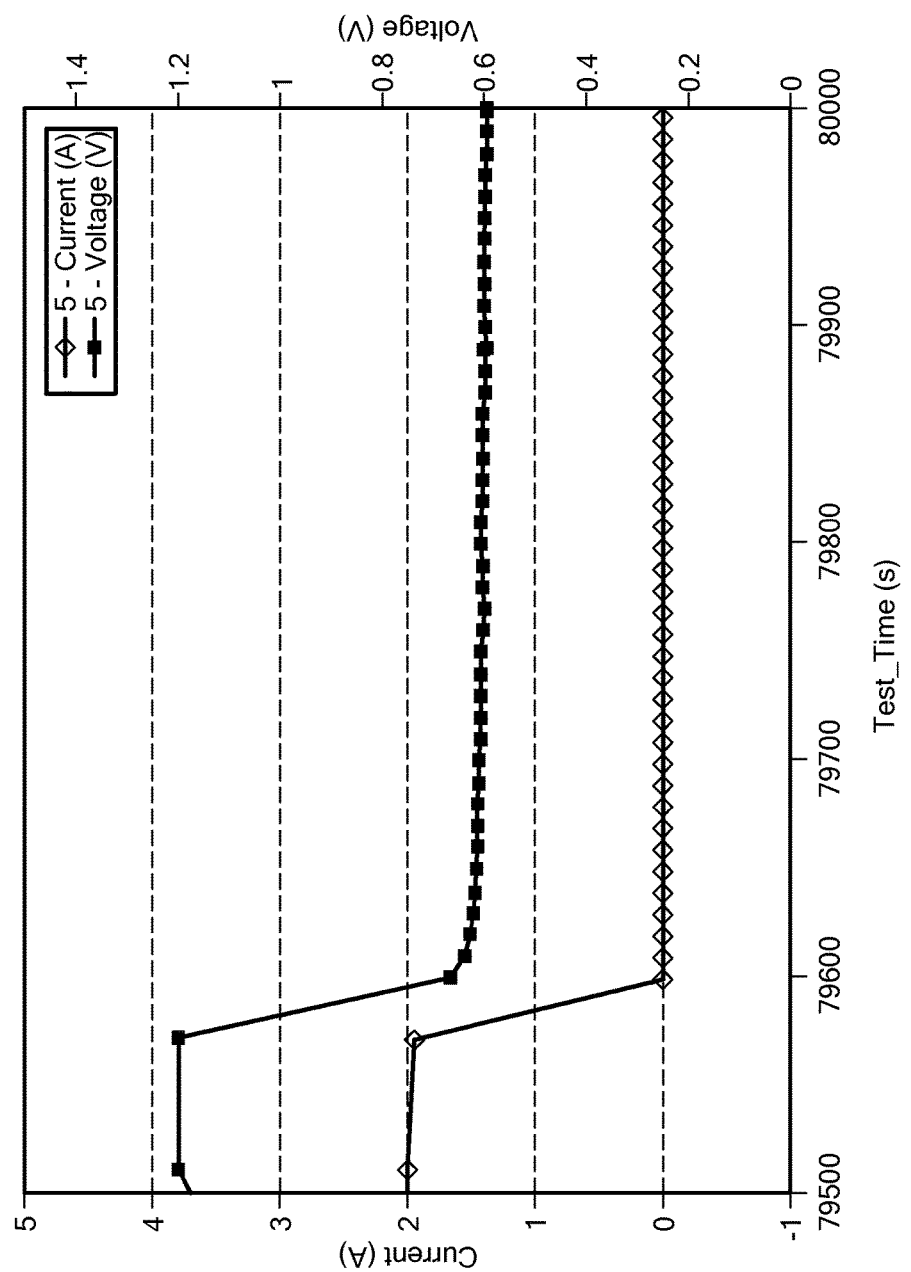
FIG. 8 is an open circuit potential of a partially charged Na—Pb/Sb system according to an embodiment of the invention.
Figure 9:
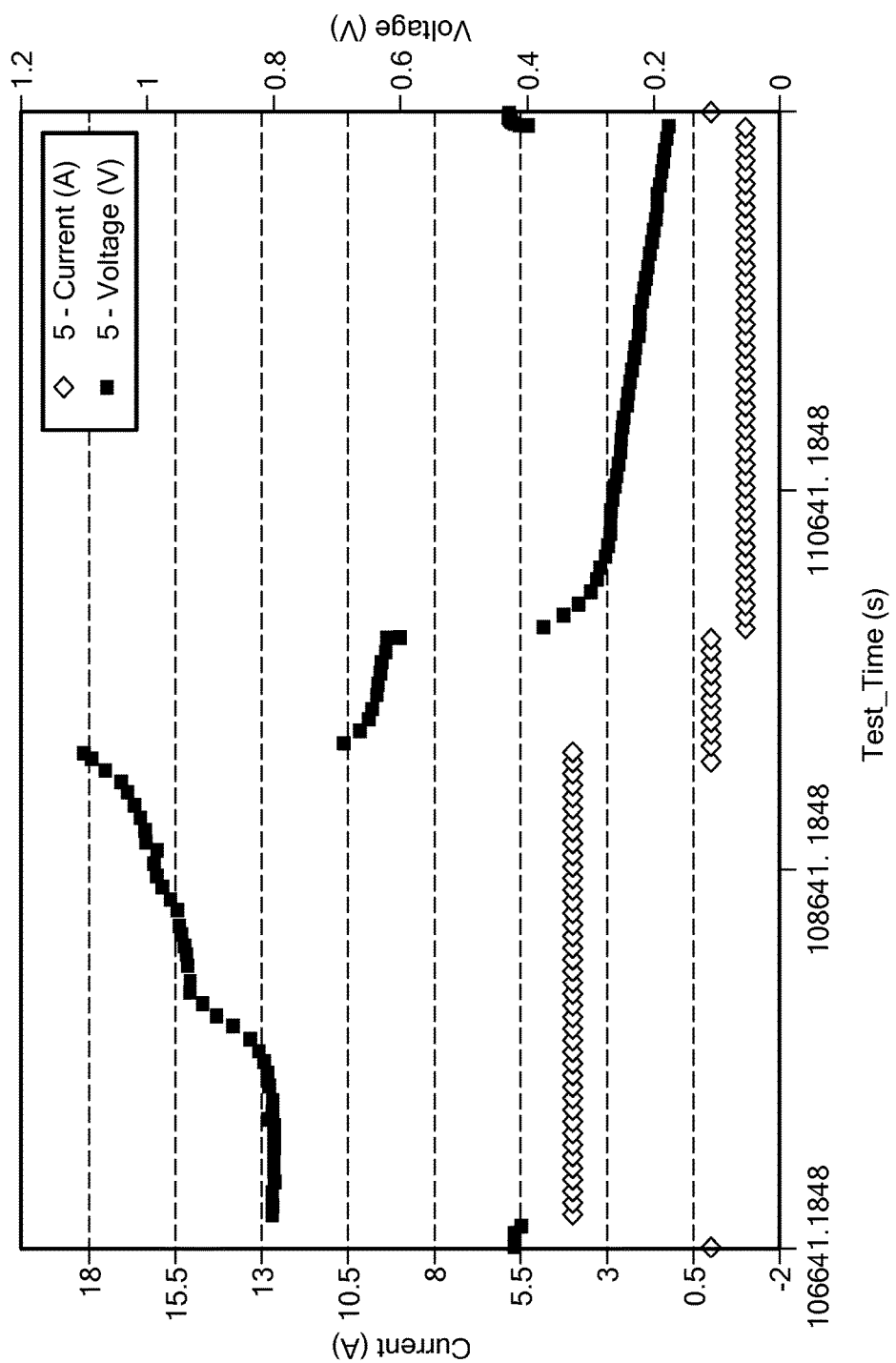
FIG. 9 is a plot of a charge and discharge cycle of a Na—Pb/Sb system according to an embodiment of the invention.

A stable potential was achieved after partially charging the cell (see FIG. 8), indicating that the self-discharge current was low. The cell was also able to reversibly charge from an open circuit potential of 0.4V to 0.6V, then discharge again to 0.4V (FIG. 9).

Example 3: The Na—Pb/Bi System

Figure 10:
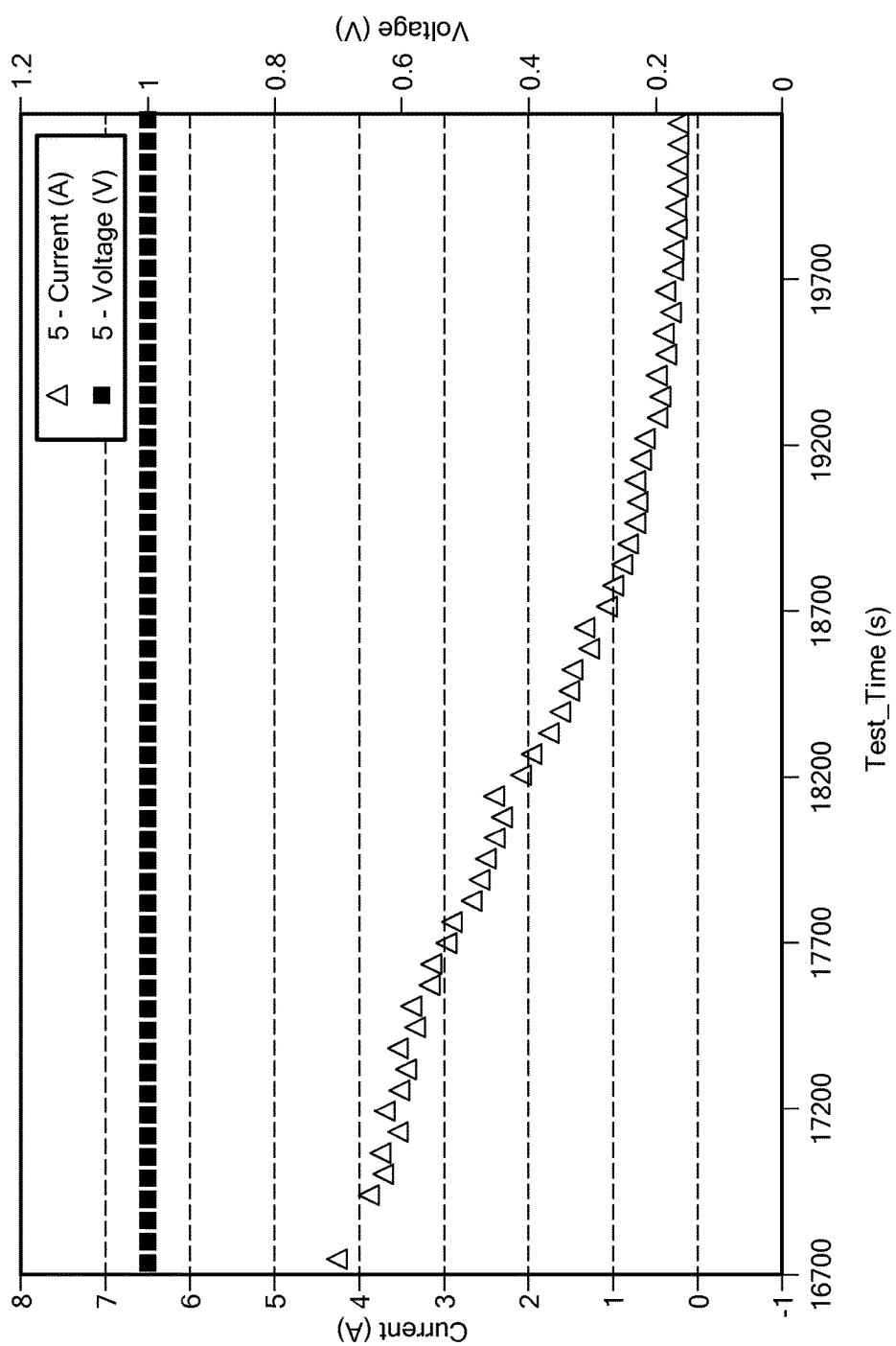
FIG. 10 is a plot of a leakage current measurement of a Na—Pb/Bi system according to an embodiment of the invention having 38 cm$^2$ in active area.

A low operating temperature Na—Pb/Bi cell was prepared with 20 mol % Pb alloyed with Bi. As shown in FIG. 10, the Na—Pb/Bi cell having 38 $cm^2$ area and operated at 275° C. has a low leakage current of 7 $mA/cm^2$. In comparison, known Na—Bi cells (without Pb) operated at the elevated temperature of 560° C. were found to have a leakage current in the order of 25 $mA/cm^2$.

Figure 11:
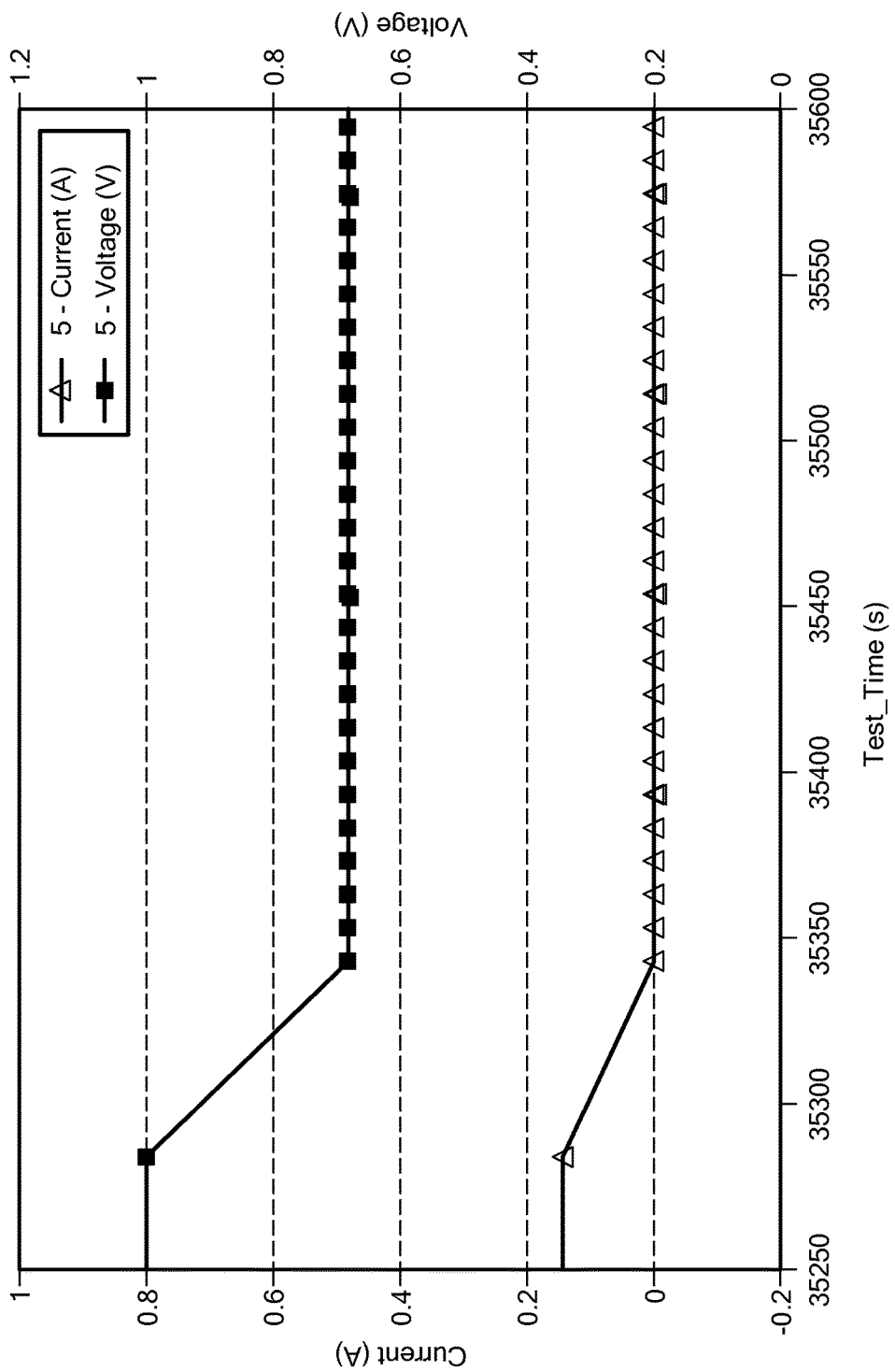
FIG. 11 is a plot of an open circuit potential of a Na—Pb/Bi system according to an embodiment of the invention after partial charging.

Similar to the Na—Pb/Sb system, the Na—Pb/Bi cell was partially charged and held at open circuit to confirm a stable voltage was attained. As can be seen in FIG. 11, the open circuit potential was found to be stable at 0.68V.

Figure 12:
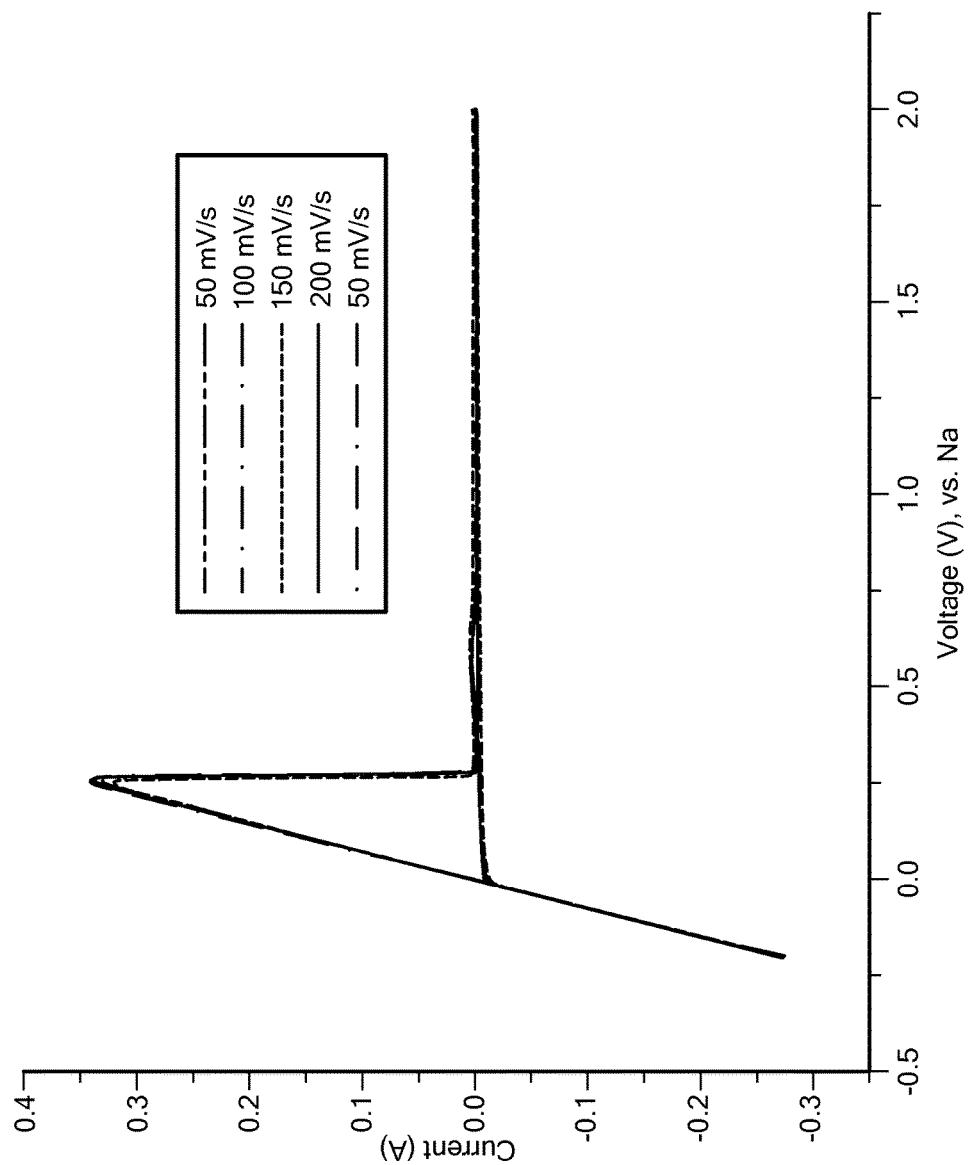
FIG. 12 is a cyclic voltammetry plot of an NaOH—NaI eutectic electrolyte (80/20 moles %, respectively) used with embodiments of the present invention.

A cyclic voltammetry experiment was conducted on the NaOH—NaI eutectic electrolyte (80/20 mole %, respectively), and the resulting plot is shown in FIG. 12. In this experiment, the counter and working electrodes were Ag, and the reference electrode was Na inside of a beta Al cup. The temperature of the experiment was 257° C. conducted in an argon atmosphere of 1 atm pressure. As shown in FIG. 12, the NaOH—NaI electrolyte can support up to a 2 volt potential difference before breaking down on its own. Therefore, the NaOH—NaI electrolyte has the appropriate electrochemical window and maintains suitable stability with sodium metal to allow for both a sodium deposition peak and a stripping peak. As known by those skilled in the art, there would be no stripping signal if sodium reacted to a great extent with the electrolyte since there would be no sodium left to react with the electrolyte upon voltage reversal. Thus, the graph shows that the NaOH—NaI electrolyte is electrochemically compatible with sodium metal and may be used in various Na cell systems, such as those discussed in embodiments of the present invention.

With cells operating at temperatures lower than 300° C., cost savings can also be realized with alternative sealing options for the containment of the cell components. Specifically, whereas previously known high temperature liquid metal battery designs require a complex series of ceramic washers, ultratorr fittings, and welded containers, containment systems for low temperatures liquid metal batteries leverage a simple O-ring design which exploit the compatibility of PTFE (Teflon) O-rings or POEM-g-PDMS. The use of this type of O-ring design greatly decreases cost and assembly time while using far fewer parts.

It should be noted that even though lower-temperature systems as disclosed herein currently operate at lower voltages than known cells operating at higher temperatures, the present systems, which are producing voltages of 770 mV and 680 mV for the Na—Hg and Na—Bi/Pb cells, respectively, still represent a gain due to the cost saving from the materials for and components of the cell, even taking into consideration the need to link multiple cells to reach high voltage output.

What is claimed is:

1. An electrochemical storage device comprising:
a positive electrode comprising a first phase including a metal alloy of lead and bismuth or lead and antimony;
an electrolyte comprising a binary salt system of an alkali metal, the binary salt system comprising a hydroxide-iodide eutectic salt of the alkali metal, the electrolyte defining first and second interfaces, the positive electrode being in contact with the electrolyte at the first interface, and the electrolyte enabling transport of a cation of the alkali metal from the positive electrode to the negative electrode or from the negative electrode to the positive electrode; and
a negative electrode, separated from the positive electrode, comprising a third phase including the alkali metal, the negative electrode being in contact with the electrolyte at the second interface,
where the alkali metal is oxidized at the positive electrode and reduced at the negative electrode during charging, and is reduced at the positive electrode and oxidized at the negative electrode during discharging,
the first phase and electrolyte have a melting temperature independently selected from 200° C. to 300° C., and
the third phase has a melting temperature selected such that the third phase is liquid at the selected melting temperatures of the first phase and electrolyte, so that the first phase, the electrolyte, and the third phase are liquid at a selected temperature from 200° C. to 300° C.

2. The device according to claim 1, wherein the binary salt system comprises a second salt of the alkali metal selected from the group consisting of a halide, a sulfate, a carbonate, and any combination thereof.

3. The device according to claim 1, wherein the alkali metal is sodium.

4. The device according to claim 1, wherein the first phase further comprises the alkali metal.

5. An electrochemical storage device comprising:
an electrolyte comprising a hydroxide-iodide eutectic salt of an alkali metal, the electrolyte defining a first interface and enabling transport of a cation of the alkali metal through the electrolyte; and a positive electrode comprising a first phase including a metal alloy of lead and bismuth or lead and antimony, the positive electrode being in contact with the electrolyte at the first interface, where the alkali metal is oxidized at the positive electrode and reduced at the negative electrode during charging, and is reduced at the positive electrode and oxidized at the negative electrode during discharging, the first phase and electrolyte have a melting temperature independently selected from 200° C. to 300° C.

6. The device according to claim 5, wherein the binary salt system comprises a second salt of the alkali metal selected from the group consisting of a halide, a sulfate, a carbonate, and any combination thereof.

7. The device according to claim 5, wherein the alkali metal is sodium.

8. A method of exchanging electrical energy with an external circuit, the method comprising:

providing the electrochemical cell of claim 1;
connecting the cell to an external circuit; and
operating the external circuit so as to drive transfer of the cation of the alkali metal between the first phase and the third phase.

9. The method according to claim 8, wherein the positive electrode further comprises the alkali metal, and the external circuit drives the cation of the alkali metal from the positive electrode to the negative electrode.

10. The method according to claim 8, wherein the alkali metal is sodium.

11. The device according to claim 1, wherein the binary salt system consists essentially of a hydroxide-iodide eutectic salt of the alkali metal.

12. An electrochemical storage device comprising:

an electrolyte consisting essentially of a hydroxide-iodide eutectic salt of an alkali metal, the electrolyte defining a first interface and enabling transport of a cation of the alkali metal through the electrolyte; and a positive electrode comprising a first phase including a metal alloy of lead and bismuth or lead and antimony, the positive electrode being in contact with the electrolyte at the first interface, where the alkali metal is oxidized at the positive electrode and reduced at the negative electrode during charging, and is reduced at the positive electrode and oxidized at the negative electrode during discharging, the first phase and electrolyte have a melting temperature independently selected from 200° C. to 300° C.

* * * * *